(12) United States Patent
Suen et al.

(10) Patent No.: US 7,760,874 B2
(45) Date of Patent: Jul. 20, 2010

(54) METHOD AND SYSTEM FOR IMPLEMENTING FI FUNCTION IN KASUMI ALGORITHM FOR ACCELERATING CRYPTOGRAPHY IN GSM/GPRS/EDGE COMPLIANT HANDSETS

(75) Inventors: Ruei-Shiang Suen, Dublin, CA (US); Srinivasan Surendran, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 1623 days.

(21) Appl. No.: 10/924,219

(22) Filed: Aug. 23, 2004

(65) Prior Publication Data

US 2006/0013388 A1 Jan. 19, 2006

Related U.S. Application Data

(60) Provisional application No. 60/587,742, filed on Jul. 14, 2004.

(51) Int. Cl.
*H04L 9/28* (2006.01)
*H04L 9/06* (2006.01)
*H04K 1/00* (2006.01)

(52) U.S. Cl. ............................. 380/42; 380/28; 380/37; 380/44; 380/270

(58) Field of Classification Search ........................ None
See application file for complete search history.

(56) References Cited

U.S. PATENT DOCUMENTS

| | | | |
|---|---|---|---|
| 5,381,480 A | | 1/1995 | Butter et al. |
| 5,623,549 A | * | 4/1997 | Ritter ............................. 380/37 |
| 6,199,162 B1 | | 3/2001 | Luyster |
| 6,314,186 B1 | * | 11/2001 | Lee et al. ........................ 380/28 |
| 6,356,636 B1 | | 3/2002 | Foster et al. |

(Continued)

FOREIGN PATENT DOCUMENTS

WO     WO03050784     *    4/2002

(Continued)

OTHER PUBLICATIONS

Marinis et al, On the harware Implementation of the 3GPP Confidentiality and Integrity Algorithms, ISC 2001, LNCS 2200, pp. 248-265, 2001, Springer-Verlag Berlin Heidelberg 2001.*

(Continued)

*Primary Examiner*—Nasser Moazzami
*Assistant Examiner*—Fatoumata Traore
(74) *Attorney, Agent, or Firm*—McAndrews, Held & Malloy, Ltd.

(57) ABSTRACT

In a wireless communication system, a method and system for implementing an FI function in a KASUMI algorithm for accelerating cryptography in GSM/GPRS/EDGE compliant handsets are provided. An efficient implementation of the FI function may comprise a first substitution stage and a second substitution stage, where a 9-bit substitution circuit and a 7-bit substitution circuit may be used in each of the stages. A pipe register may be used to transfer and zero-extend an input to the 7-bit substitution circuit for processing with an output of the 9-bit substitution circuit. A first multiplexer and a second multiplexer may be used to select the inputs for the substitution circuits at each one of the substitution stages. A third multiplexer and a fourth multiplexer may be used to select subkeys for encryption during the first substitution stage and zero value signals during the second substitution stage.

47 Claims, 10 Drawing Sheets

U.S. PATENT DOCUMENTS

| | | | |
|---|---|---|---|
| 7,184,549 | B2 | 2/2007 | Sorimachi et al. |
| 7,212,631 | B2 | 5/2007 | Averbuj et al. |
| 2002/0041685 | A1* | 4/2002 | McLoone et al. ............. 380/45 |
| 2002/0186841 | A1* | 12/2002 | Averbuj et al. ................ 380/44 |
| 2003/0007636 | A1 | 1/2003 | Alves et al. |
| 2004/0047466 | A1 | 3/2004 | Feldman et al. |
| 2004/0131180 | A1 | 7/2004 | Mazuz et al. |
| 2004/0156499 | A1 | 8/2004 | Heo et al. |
| 2004/0208321 | A1 | 10/2004 | Wary |
| 2005/0226407 | A1 | 10/2005 | Kasuya et al. |
| 2005/0238166 | A1* | 10/2005 | Koshy et al. ................ 380/28 |

OTHER PUBLICATIONS

3GPP Organizational Partners, "3rd Generation Partnership Project: Technical Specification Group Services and Systems Aspects, 3G Security, Specification of the 3GPP Confidentiality and Integrity Algorithms, Document 2: KATSUMI Specification (Release 5)" 2002.

3GPP Organizational Partners, "3rd Generation Partnership Project: Technical Specification Group Services and Systems Aspects, 3G Security, Specification of the A5/3 Encryption Algorithms for GSM and ECSD, and the GEA3 Encryption Algorithm for GPRS, Document 1: A5/3 and GEA3 Specifications (Release 6)" 2002.

3GPP Organizational Partners, 3RD Generation Partnership Project: Technical Specification Group Services and System Aspects: 3G Security; Specification of the 3GPP Confidentiality and Integrity Algorithms; Document 1: f8 and f9 Specification (Release 4), 3GPP TS 35.201 V4.1.0 (Dec. 2001).

\* cited by examiner

| | 1 | 2 | 3 | 4 | 5 | 6 | 7 | 8 |
|---|---|---|---|---|---|---|---|---|
| $KL_{i,1}$ | $K_1 <<<< 1$ | $K_2 <<<< 1$ | $K_3 <<<< 1$ | $K_4 <<<< 1$ | $K_5 <<<< 1$ | $K_6 <<<< 1$ | $K_7 <<<< 1$ | $K_8 <<<< 1$ |
| $KL_{i,2}$ | $K_3'$ | $K_4'$ | $K_5'$ | $K_6'$ | $K_7'$ | $K_8'$ | $K_1'$ | $K_2'$ |

| | 1 | 2 | 3 | 4 | 5 | 6 | 7 | 8 |
|---|---|---|---|---|---|---|---|---|
| $KO_{i,1}$ | $K_2 <<<< 5$ | $K_3 <<<< 5$ | $K_4 <<<< 5$ | $K_5 <<<< 5$ | $K_6 <<<< 5$ | $K_7 <<<< 5$ | $K_8 <<<< 5$ | $K_1 <<<< 5$ |
| $KO_{i,2}$ | $K_6 <<<< 8$ | $K_7 <<<< 8$ | $K_8 <<<< 8$ | $K_1 <<<< 8$ | $K_2 <<<< 8$ | $K_3 <<<< 8$ | $K_4 <<<< 8$ | $K_5 <<<< 8$ |
| $KO_{i,3}$ | $K_7 <<<< 13$ | $K_8 <<<< 13$ | $K_1 <<<< 13$ | $K_2 <<<< 13$ | $K_3 <<<< 13$ | $K_4 <<<< 13$ | $K_5 <<<< 13$ | $K_6 <<<< 13$ |

| | 1 | 2 | 3 | 4 | 5 | 6 | 7 | 8 |
|---|---|---|---|---|---|---|---|---|
| $KI_{i,1}$ | $K_5'$ | $K_6'$ | $K_7'$ | $K_8'$ | $K_1'$ | $K_2'$ | $K_3'$ | $K_4'$ |
| $KI_{i,2}$ | $K_4'$ | $K_5'$ | $K_6'$ | $K_7'$ | $K_8'$ | $K_1'$ | $K_2'$ | $K_3'$ |
| $KI_{i,3}$ | $K_8'$ | $K_1'$ | $K_2'$ | $K_3'$ | $K_4'$ | $K_5'$ | $K_6'$ | $K_7'$ |

FIG. 10

METHOD AND SYSTEM FOR IMPLEMENTING FI FUNCTION IN KASUMI ALGORITHM FOR ACCELERATING CRYPTOGRAPHY IN GSM/GPRS/EDGE COMPLIANT HANDSETS

CROSS-REFERENCE TO RELATED APPLICATIONS/INCORPORATION BY REFERENCE

This patent application makes reference to, claims priority to and claims benefit from U.S. Provisional Patent Application Ser. No. 60/587,742, entitled "Method and System for Implementing FI Function in KASUMI Algorithm for Accelerating Cryptography in GSM/GPRS/EDGE Compliant Handsets," filed on Jul. 14, 2004.

This application makes reference to:

U.S. application Ser. No. 10/924,002 filed Aug. 23, 2004;

U.S. application Ser. No. 10/923,954 filed Aug. 23, 2004;

U.S. application Ser. No. 10/924,214 filed Aug. 23, 2004; and

U.S. application Ser. No. 10/924,177 filed Aug. 23, 2004.

The above stated applications are hereby incorporated herein by reference in their entirety.

FIELD OF THE INVENTION

Certain embodiments of the invention relate to cryptography. More specifically, certain embodiments of the invention relate to a method and system for implementing FI function in KASUMI algorithm for accelerating cryptography in GSM/GPRS/EDGE compliant handsets.

BACKGROUND OF THE INVENTION

In wireless communication systems, the ability to provide secure and confidential transmissions becomes a highly important task as these systems move towards the next generation of data services. Secure wireless transmissions may be achieved by applying confidentiality and integrity algorithms to encrypt the information to be transmitted. For example, the Global System for Mobile Communication (GSM) uses the A5 algorithm to encrypt both voice and data and the General Packet Radio Service (GPRS) uses the GEA algorithm to provide packet data encryption capabilities in GSM systems. The next generation of data services leading to the so-called third generation (3G) is built on GPRS and is known as the Enhanced Data rate for GSM Evolution (EDGE). Encryption in EDGE systems may be performed by either the A5 algorithm or the GEA algorithm depending on the application. One particular EDGE application is the Enhanced Circuit Switch Data (ECSD).

There are three variants of the A5 algorithm: A5/1, A5/2, and A5/3. The specifications for the A5/1 and the A5/2 variants are confidential while the specifications for the A5/3 variant are provided by publicly available technical specifications developed by the 3rd Generation Partnership Project (3GPP). Similarly, three variants exist for the GEA algorithm: GEA1, GEA2, and GEA3. The specifications for the GEA3 variant are also part of the publicly available 3GPP technical specifications while specifications for the GEA1 and GEA2 variants are confidential. The technical specifications provided by the 3GPP describe the requirements for the A5/3 and the GEA3 algorithms but do not provide a description of their implementation.

Variants of the A5 and GEA algorithms are based on the KASUMI algorithm which is also specified by the 3GPP. The KASUMI algorithm is a symmetric block cipher with a Feistel structure or Feistel network that produces a 64-bit output from a 64-bit input under the control of a 128-bit key. Feistel networks and similar constructions are product ciphers and may combine multiple rounds of repeated operations, for example, bit-shuffling functions, simple non-linear functions, and/or linear mixing operations. The bit-shuffling functions may be performed by permutation boxes or P-boxes. The simple non-linear functions may be performed by substitution boxes or S-boxes. The linear mixing may be performed using XOR operations. The 3GPP standards further specify three additional variants of the A5/3 algorithm: an A5/3 variant for GSM, an A5/3 variant for ECSD, and a GEA3 variant for GPRS (including Enhanced GPRS or EGPRS).

The A5/3 variant utilizes three algorithms and each of these algorithms uses the KAZUMI algorithm as a keystream generator in an Output Feedback Mode (OFB). All three algorithms may be specified in terms of a general-purpose keystream function KGCORE. The individual encryption algorithms for GSM, GPRS and ECSD may be defined by mapping their corresponding inputs to KGCORE function inputs, and mapping KGCORE function outputs to outputs of each of the individual encryption algorithms. The heart of the KGCORE function is the KASUMI cipher block, and this cipher block may be used to implement both the A5/3 and GEA3 algorithms.

Implementing the A5/3 algorithm directly in an A5/3 algorithm block or in a KGCORE function block 200, however, may require ciphering architectures that provide fast and efficient execution in order to meet the transmission rates, size and cost constraints required by next generation data services and mobile systems. A similar requirement may be needed when implementing the GEA3 algorithm directly in a GEA3 algorithm block or in a KGCORE function block. Because of their complexity, implementing these algorithms in embedded software to be executed on a general purpose processor on a system-on-chip (SOC) or on a digital signal processor (DSP), may not provide the speed or efficiency necessary for fast secure transmissions in a wireless communication network. Moreover, these processors may need to share some of their processing or computing capacity with other applications needed for data processing. The development of cost effective integrated circuits (IC) capable of accelerating the encryption and decryption speed of the A5/3 algorithm and the GEA3 algorithm is necessary for the deployment of next generation data services.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Certain embodiments of the invention may be found in a method and system for implementing an FI function in the KASUMI algorithm for accelerating cryptography in GSM/GPRS/EDGE compliant handsets. Aspects of the method may comprise generating a first signal that controls a first substitution circuit and a second substitution circuit during a first stage of substitution and also during a second stage of substitution in the FI function. The first signal may be a delayed version of a start signal and may be delayed by one clock cycle from the start signal.

A first substituted output from a first portion of an input data may be generated by using the first substitution circuit during a first round of the first stage. A second substituted output may be generated from a second portion of the input data by using the second substitution circuit during a second round of the first stage. Transfer of the second portion of the input data may be pipelined for processing with the generated first substituted output from the first substitution circuit during the first round of the first stage and also during a third round of the second stage. The method may also comprise zero-extending the second portion of the input data to the second substitution circuit for the pipelining transfer.

A first XORed output may be generated by XORing the zero-extended second portion of the input data to the second substitution circuit with the generated first substituted output from the first substitution circuit during the first round of the first stage. The first XORed output may be truncated to generate a first truncated output during a second round of the first stage. A second XORed output may be generated by XORing the first truncated output with the generated second substituted output from the second substitution circuit during the second round of the first stage.

The method may also comprise selecting a second subkey and XORing the selected second subkey with the second XORed output to generate a third XORed output during the second round of the first stage. Moreover, a first subkey may also be selected and may be XORed with the first XORed output to generate a fourth XORed output during the second round of the first stage of substitution. A third substituted output may be generated from the fourth XORed output by using the first substitution circuit during the third round in the second stage of substitution. The method may also comprise zero-extending the third XORed output for the pipelining transfer during the third round of the second stage.

A fifth XORed output may be generated by XORing the zero-extended third XORed output with the generated third substituted output from the first substitution circuit during the third round of the second stage. The fifth XORed output may be truncated to generate a second truncated output during a fourth round of the second stage. A fourth substituted output may be generated from the third XORed output by using the second substitution circuit during the fourth round of the second stage. A sixth XORed output may be generated by XORing the second truncated output with the generated fourth substituted output from the second substitution circuit during the fourth round of the second stage.

The method may also comprise selecting a second zero value and XORing the selected second zero value with the sixth XORed output to generate a seventh XORed output during the fourth round of the second stage of substitution. Moreover, a first zero value may also be selected and may be XORed with the fifth XORed output to generate an eighth XORed output during the fourth round of the second stage. Output data may be generated by concatenating the seventh XORed output and the eighth XORed output.

Aspects of the system may comprise a first substitution circuit, a second substitution circuit, and a pipe register. The first substitution circuit may generate a first substituted output from a first portion of an input data during a first round of a first stage of substitution. The second substitution circuit may generate a second substituted output from a second portion of the input data during a second round of the first stage of substitution. The pipe register may be adapted to pipeline transfer of the second portion of the input data for processing with the generated first substituted output from the first substitution circuit during the first round of the first stage. The first substitution circuit may generate a third substituted output during a third round of a second stage of substitution while the second substitution circuit may generate a fourth substituted output during a fourth round of the second stage of substitution.

The system may also comprise a first multiplexer that selects an input to the first substitution circuit for the first stage and for the second stage and a second multiplexer that selects an input to the second substitution circuit for the first stage and for a second stage. Moreover, a third multiplexer may select between a first subkey during the first stage and a first zero value during the second stage while a fourth multiplexer may select between a second subkey during the first stage and a second zero value during the second stage.

A first XOR gate may be utilized to XOR an output of the first substitution circuit with an output of the pipe register. A second XOR gate may be utilized to XOR an output of the first XOR gate with an output of the third multiplexer. A third XOR gate may be utilized to XOR an output of the second substitution circuit with an output of the first XOR gate. And a fourth XOR gate may be utilized to XOR an output of the second XOR gate with an output of the fourth multiplexer.

In another embodiment of the invention the system may comprise circuitry for generating a first signal that controls a first stage and a second stage of substitution in a first substitution circuit and a second substitution circuit. The system may also comprise circuitry for generating a first substituted output and a second substituted output during the first stage and a third substituted output and a fourth substituted output during the second stage. Circuitry may also be provided which is adapted to pipeline transfer of a portion of the input data for processing with the generated first substituted output during a first round of the first stage and during a third round of the second stage.

Circuitry may be provided to generate a first XORed output, a second XORed output, a third XORed output, and a fourth XORed output during the first stage and for generating a fifth XORed output, a sixth XORed output, a seventh XORed output, and an eight XORed output during the second stage. Circuitry may be adapted or additional circuitry provided to zero-extend and to truncate data during the first and second stage.

The system may also comprise circuitry that may be adapted to select the input to the first substitution circuit and to the second substitution circuit during the first stage and during the second stage. Circuitry may also be provided that is adapted to select a first subkey and a second subkey during the first stage and to select a first zero value and a second zero value during the second stage.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 10 illustrates the round subkeys generated by a key scheduler from the arrays of subkeys $K_j$ and $K_j'$ for the eight-round KASUMI algorithm, in accordance with an embodiment of the invention.

DETAILED DESCRIPTION OF THE INVENTION

Certain embodiments of the invention may be found in a method and system for implementing an FI function in the KASUMI algorithm for accelerating cryptography in GSM/GPRS/EDGE compliant handsets. The four-round FI function in the KASUMI algorithm may be implemented using a two stage approach. The implementation may comprise a first substitution stage and a second substitution stage, where a 9-bit substitution circuit and a 7-bit substitution circuit may be used in each of the stages. A pipe register may be used to transfer and zero-extend an input to the 7-bit substitution circuit for processing with an output of the 9-bit substitution circuit. This implementation approach utilizes two clock cycles of operation to execute the FI function, thereby providing a cost effective and efficient implementation that accelerates cryptographic operations in GSM/GPRS/EDGE compliant handsets.

Figure 1A:
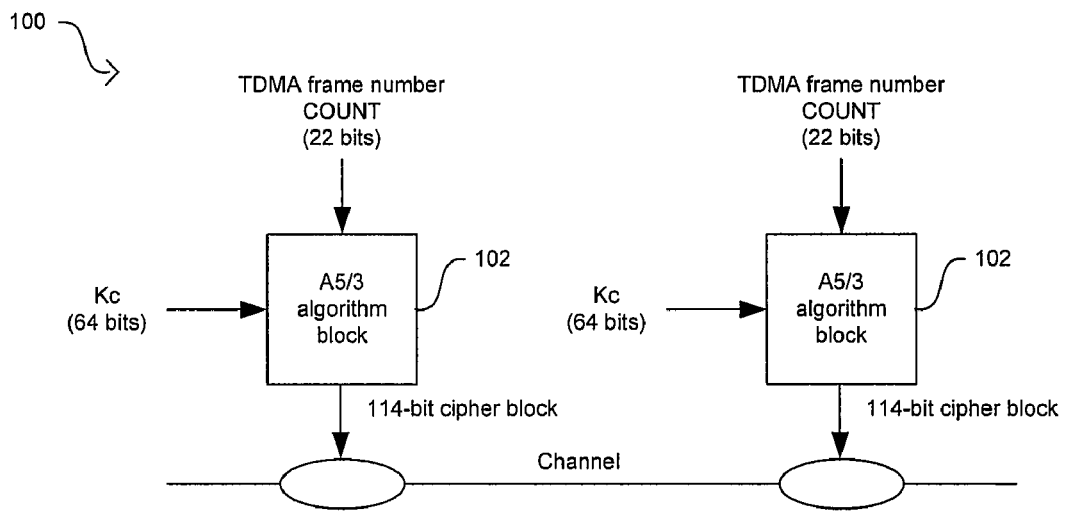
FIG. 1A is a block diagram of an exemplary A5/3 data encryption system for GSM communications, as disclosed in 3rd Generation Partnership Project, Technical Specification Group Services and System Aspects, 3G Security, Specification of the A5/3 Encryption Algorithms for GSM and ECSD, and the GEA3 Encryption Algorithm for GPRS, Document 1, A5/3 and GEA3 Specifications, Release 6 (3GPP TS 55.216 V6.1.0, 2002-12).

FIG. 1A is a block diagram of an exemplary A5/3 data encryption system for GSM communications, as disclosed in 3rd Generation Partnership Project, Technical Specification Group Services and System Aspects, 3G Security, Specification of the A5/3 Encryption Algorithms for GSM and ECSD, and the GEA3 Encryption Algorithm for GPRS, Document 1, A5/3 and GEA3 Specifications, Release 6 (3GPP TS 55.216 V6.1.0, 2002-12). Referring to FIG. 1A, the GSM encryption system 100 may comprise a plurality of A5/3 algorithm blocks 102. The A5/3 algorithm block 102 may be used for encryption and/or decryption and may be communicatively coupled to a wireless communication channel. The A5/3 algorithm block 102 may be used to encrypt data transmitted on a DCCH (Dedicated Control Channel) and a TCH (Traffic Channel). The inputs to the A5/3 algorithm block 102 may comprise a 64-bit privacy key, Kc, and a TDMA frame number COUNT. The COUNT parameter is 22-bits wide and each frame represented by the COUNT parameter is approximately 4.6 ms in duration. The COUNT parameter may take on decimal values from 0 to 4194304, and may have a repetition time of about 5 hours, which is close to the interval of a GSM hyper frame. For each frame, two outputs may be generated by the A5/3 algorithm block 102: BLOCK1 and BLOCK2. Because of the symmetry of the A5/3 stream cipher, the BLOCK1 output may be used, for example, for encryption by a Base Station (BS) and for decryption by a Mobile Station (MS) while the BLOCK2 output may be used for encryption by the MS and for decryption by the BS. In GSM mode, the BLOCK1 output and the BLOCK2 output are 114 bits wide each. In EDGE mode, the BLOCK1 output and the BLOCK2 output are 348 bits wide each.

Figure 1B:
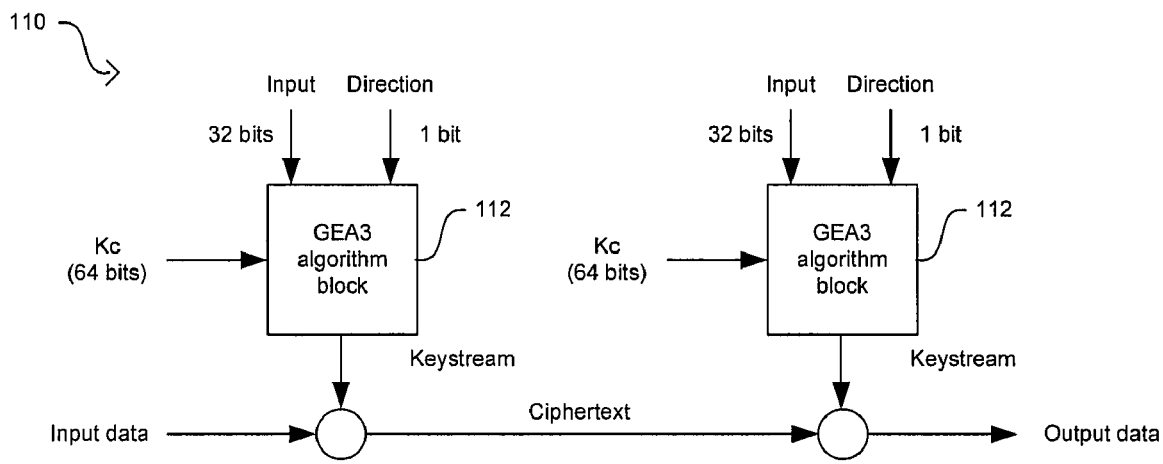
FIG. 1B is a block diagram of an exemplary GEA3 data encryption system for GPRS/EGPRS communications, which may be utilized in connection with an embodiment of the invention.

FIG. 1B is a block diagram of an exemplary GEA3 data encryption system for GPRS/EGPRS communications, which may be utilized in connection with an embodiment of the invention. Referring to FIG. 1B, the GPRS/EGPRS encryption system 110 may comprise a plurality of GEA3 algorithm blocks 112. The GEA3 algorithm block 112 may be used for data encryption in GPRS and may also be used in EGPRS which achieves higher data rates through an 8 Phase Shift Key (PSK) modulation scheme. A Logical Link Control (LLC) layer is the lowest protocol layer that is common to both an MS and a Serving GPRS Support Node (SGSN). As a result, the GEA3 encryption may take place on the LLC layer.

When ciphering is initiated, a higher layer entity, for example, Layer 3, may provide the LLC layer with the 64-bit key, $K_C$, which may be used as an input to the GEA3 algorithm block 112. The LLC layer may also provide the GEA3 algorithm block 112 with a 32-bit INPUT parameter and a 1-bit DIRECTION parameter. The GEA3 algorithm block 112 may also be provided with the number of octets of OUTPUT keystream data required. The DIRECTION parameter may specify whether the current keystream will be used for upstream or downstream communication, as both directions use a different keystream. The INPUT parameter may be used so that each LLC frame is ciphered with a different segment of the keystream. This parameter is calculated from the LLC frame number, a frame counter, and a value supplied by the SGSN called the Input Offset Value (IOV).

Figure 2A:
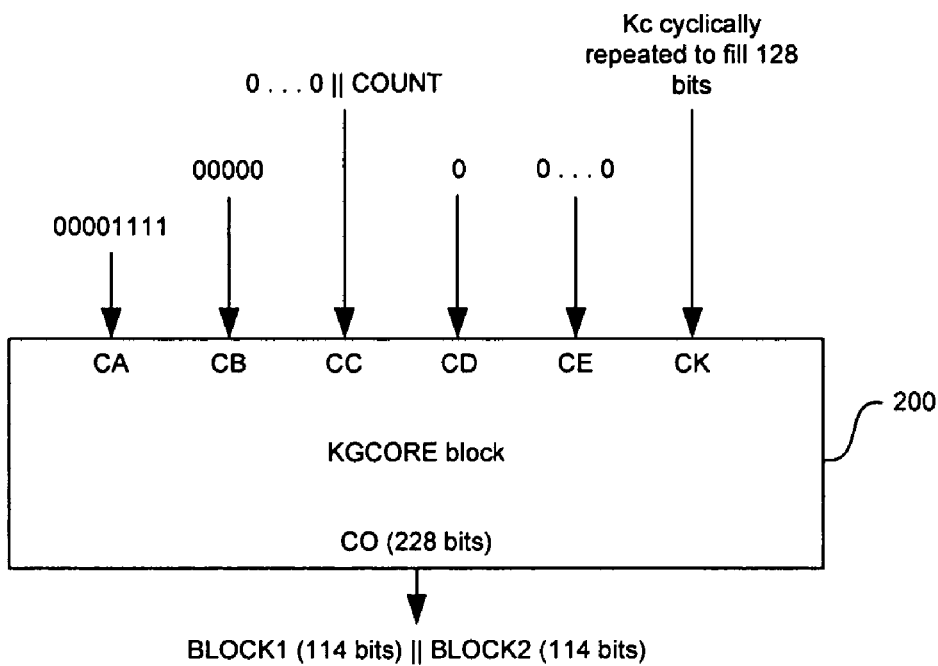
FIG. 2A is a diagram of an exemplary set-up for a KGCORE block to operate as a GSM A5/3 keystream generator function, which may be utilized in connection with an embodiment of the invention.

FIG. 2A is a diagram of an exemplary set-up for a KGCORE function block to operate as an A5/3 keystream generator function, which may be utilized in connection with an embodiment of the invention. Referring to FIG. 2A, the KGCORE function block 200 may receive as inputs a CA parameter, a CB parameter, a CC parameter, a CD parameter, a CE parameter, a CK parameter, and a CL parameter. The KGCORE function block 200 may produce an output defined by a CO parameter. The function or operation of the KGCORE function block 200 may be defined by the input parameters. The values shown in FIG. 2A may be used to map the GSM A5/3 algorithm inputs and outputs to the inputs and outputs of the KGCORE function. For example, the CL parameter specifies the number of output bits to produce, which for GSM applications is 128. In this case, the outputs CO[0] to CO[113] of the KGCORE function block 200 may map to the outputs BLOCK1[0] to BLOCK1[113] of the A5/3 algorithm. Similarly, the outputs CO[114] to CO[227] of the KGCORE function block 200 may map to the outputs BLOCK2[0] to BLOCK2[113] of the A5/3 algorithm.

Figure 2B:
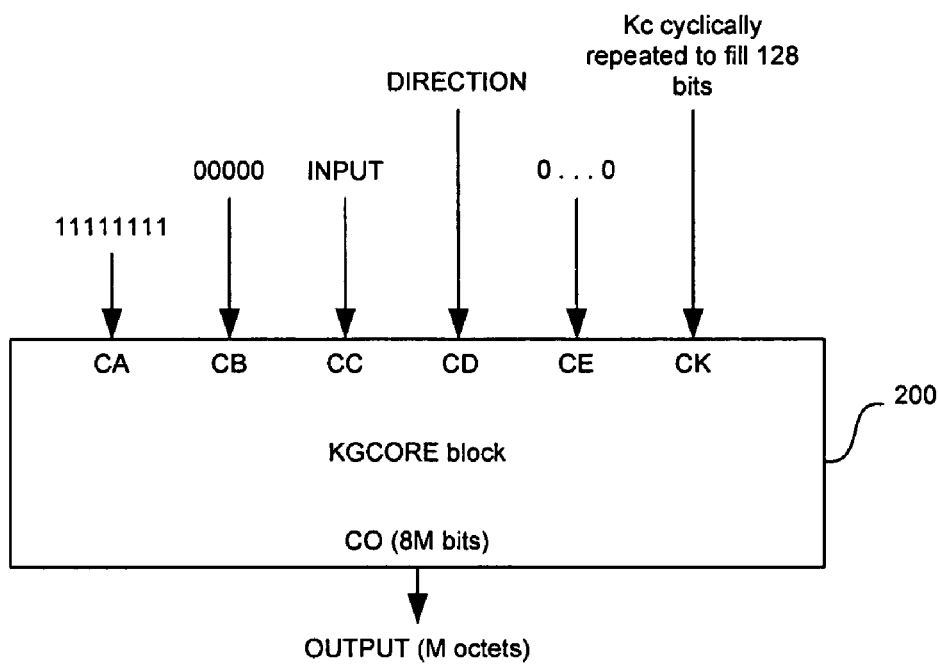
FIG. 2B is a diagram of an exemplary set-up for a KGCORE block to operate as a GEA3 keystream generator function, which may be utilized in connection with an embodiment of the invention.

FIG. 2B is a diagram of an exemplary set-up for a KGCORE function block to operate as a GEA3 keystream generator function, which may be utilized in connection with an embodiment of the invention. Referring to FIG. 2B, the KGCORE function block 200 may be used to map the GPRS GEA3 algorithm inputs and outputs to the inputs and outputs of the KGCORE function. For example, the CL parameter specifies the number M of octets of output required, producing a total of 8M bits of output. In this case, the outputs CO[0] to CO[8M−1] of the KGCORE function block 200 may map to the outputs of the GEA3 algorithm by OUTPUT[i]=CO[8$i$] ... CO[8$i$+7], where $0 \leq i \leq M-1$.

Figure 3:
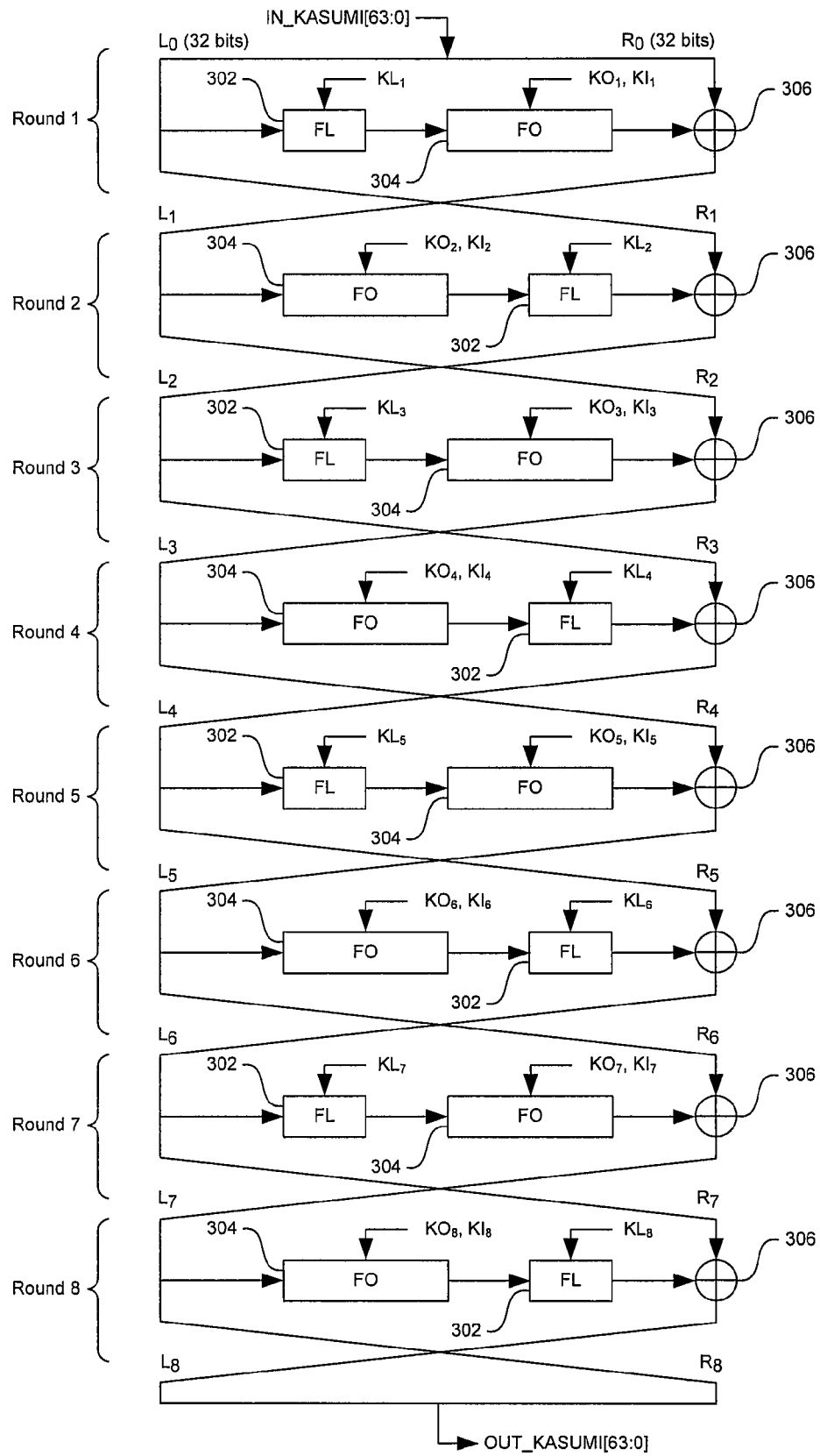
FIG. 3 is a flow diagram that illustrates an eight-round KASUMI algorithm, as disclosed in 3rd Generation Partnership Project, Technical Specification Group Services and System Aspects, Specification of the 3GPP Confidentiality and Integrity Algorithms, Kasumi Specification, Release 5 (3GPP TS 35.202 V5.0.0, 2002-06).

FIG. 3 is a flow diagram that illustrates an eight-round KASUMI algorithm, as disclosed in 3rd Generation Partnership Project, Technical Specification Group Services and System Aspects, Specification of the 3GPP Confidentiality and Integrity Algorithms, Kasumi Specification, Release 5 (3GPP TS 35.202 V5.0.0, 2002-06). Referring to FIG. 3, the eight-round KASUMI algorithm operates on a 64-bit data input (IN_KASUMI[63:0]) under the control of a 128-bit key to produce a 64-bit output (OUT_KASUMI[63:0]). Each round of the KASUMI algorithm comprises an FL function 302, an FO function 304, and a bitwise XOR operation 306. For each round of the KASUMI algorithm, the FL function 302 may utilize a subkey KL while the FO function 304 may utilize a subkey KO and a subkey KI. The FL function 302 may comprise suitable logic, circuitry, and/or code that may be adapted to perform the FL function of the KASUMI algorithm as specified by the 3GPP technical specification. The FO function 304 may comprise suitable logic, circuitry, and/or code that may be adapted to perform the FO function of the KASUMI algorithm as specified by the 3GPP technical specification. The bitwise XOR operation 306 may comprise suitable logic, circuitry, and/or code that may be adapted to perform a 32-bit bitwise XOR operation on its inputs.

In operation, the input IN_KASUMI[63:0] may be divided into two 32-bit strings $L_0$ and $R_0$. The input IN_KASUMI[63:0]=$L_0 \| R_0$, where the $\|$ operation represents concatenation. The 32-bit strings inputs for each round of the KASUMI algorithm may be defined as $R_i = L_{i-1}$ and $L_i = R_{i-1} \oplus f_i(L_{i-1}, RK_i)$, where $1 \leq i \leq 8$, where $f_i()$ denotes a general $i^{th}$ round function with $L_{i-1}$ and round key $RK_i$ as inputs, and the $\oplus$ operation corresponds to the bitwise XOR operation 306. The result of the KASUMI algorithm is a 64-bit string output (OUT_KASUMI[63:0]=$L_8 \| R_8$) produced at the end of the eighth round.

The function $f_i()$ may take a 32-bit input and may return a 32-bit output under the control of the $i^{th}$ round key $RK_i$, where the $i^{th}$ round key $RK_i$ comprises the subkey triplet $KL_i$, $KO_i$, and $KI_i$. The function $f_i()$ comprises the FL function 302 and the FO function 304 with associated subkeys $KL_i$ used with the FL function 302 and subkeys $KO_i$ and $KI_i$ used with the FO function 304. The $f_i()$ function may have two different forms depending on whether it is an even round or an odd round. For rounds 1, 3, 5 and 7 the $f_i()$ function may be defined as $f_i(L_{i-1}, RK_i) = FO(FL(L_{i-1}, KL_i), KO_i, KI_i)$ and for rounds 2, 4, 6 and 8 it may be defined as $f_i(L_{i-1}, RK_i) = FL(FO(L_{i-1}, KO_i, KI_i), KL_i)$. That is, for odd rounds, the round data is passed through the FL function 302 first and then through the FO function 304, while for even rounds, data is passed through the FO function 304 first and then through the FL function 302. The appropriate round key $RK_i$ for the $i^{th}$ round of the KASUMI algorithm, comprising the subkey triplet of $KL_i$, $KO_i$, and $KI_i$, may be generated by a Key scheduler, for example.

Figure 4:
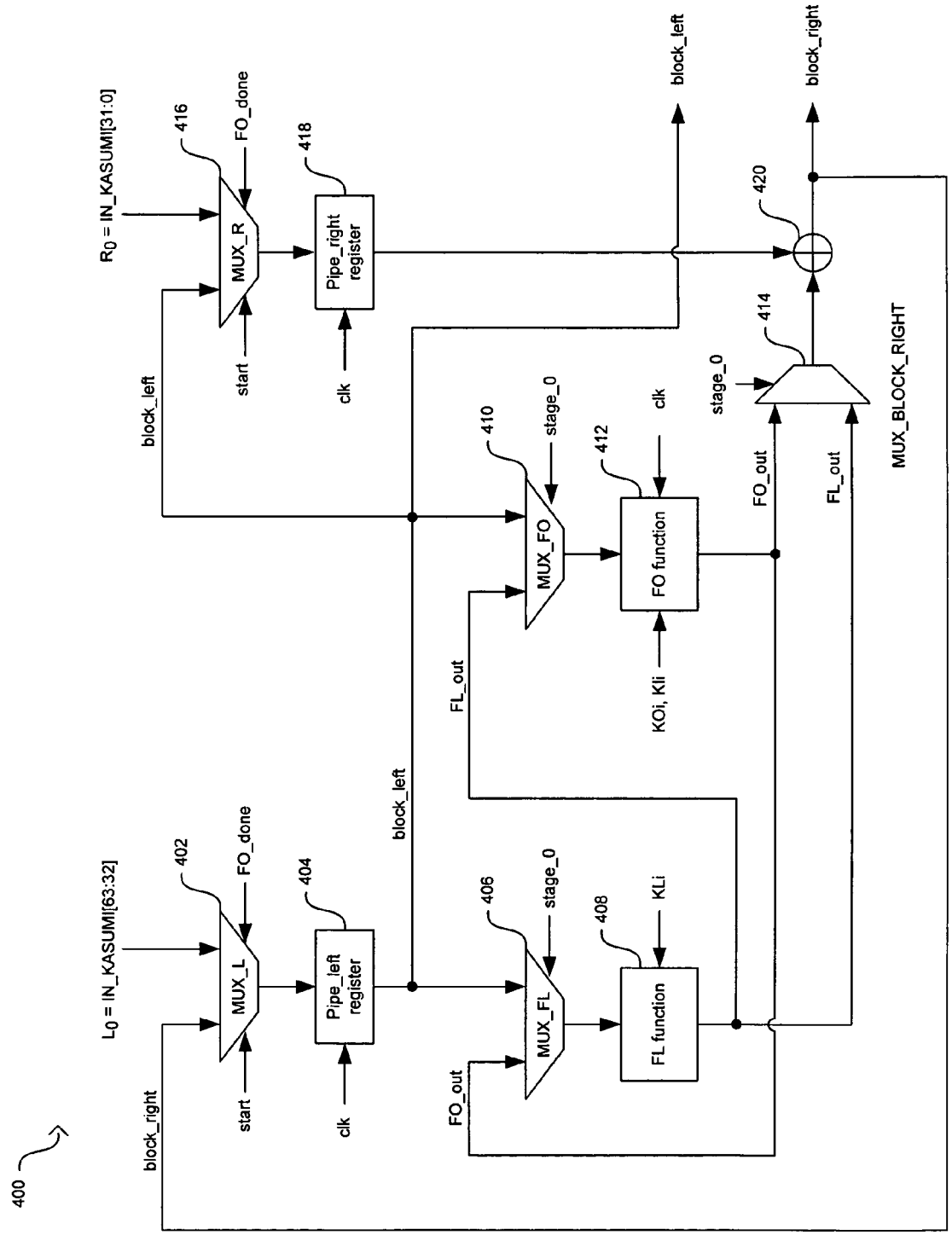
FIG. 4 is a block diagram of an exemplary system for performing the eight-round KASUMI algorithm, in accordance with an embodiment of the invention.

FIG. 4 is a block diagram of an exemplary system for performing the eight-round KASUMI algorithm, in accordance with an embodiment of the invention. Referring to FIG. 4, the exemplary system for performing the eight-round KASUMI algorithm may comprise a MUX_L multiplexer 402, a pipe_left register 404, a MUX_FL multiplexer 406, an FL function 408, a MUX_FO multiplexer 410, an FO function 412, a MUX_BLOCK_RIGHT multiplexer 414, a MUX_R multiplexer 416, a pipe_right register 418, and a bitwise XOR operation 420.

The MUX_L multiplexer 402 may comprise suitable logic, circuitry, and/or code that may be adapted to select between the 32 most significant bits (MSB) of the input signal ($L_0$=IN_KASUMI[63:32]) and the block_right signal generated in a previous round of the KASUMI algorithm. The selection may be controlled by a start signal and an FO_done signal generated by the FO function 412. The pipe_left register 404 may comprise suitable logic, circuitry, and/or code that may be adapted to store the output of the MUX_L multiplexer 402 based on an input clock (clk) signal. The pipe_left register 404 may produce an output signal denoted as block_left. The MUX_FL multiplexer 406 may comprise suitable logic, circuitry, and/or code that may be adapted to select between the output of the pipe_left register 404 and an FO_out signal generated by the FO function 412. The selection may be controlled by a stage_0 signal. The FL function 408 may comprise suitable logic, circuitry, and/or code that may be adapted to perform the FL function in the KASUMI algorithm as specified by the 3GPP technical specification. The FL function 408 may produce an FL_out signal.

The MUX_FO multiplexer 410 may comprise suitable logic, circuitry, and/or code that may be adapted to select between the output of the pipe_left register 404 and the FL_out signal generated by the FL function 408. The selection may be controlled by the stage_0 signal. The FO function 412 may comprise suitable logic, circuitry, and/or code that may be adapted to perform the FO function in the KASUMI algorithm as specified by the 3GPP technical specification. The FO function 412 may produce an FO_out signal.

The MUX_R multiplexer 416 may comprise suitable logic, circuitry, and/or code that may be adapted to select between the 32 least significant bits (LSB) of the input signal $R_0$=IN_KASUMI[31:0] and the block_left signal generated in a previous round of the KASUMI algorithm. The selection may be controlled by a start signal and an FO_done signal generated by the FO function 412. The pipe_right register 418 may comprise suitable logic, circuitry, and/or code that may be adapted to store the output of the MUX_R multiplexer 416 based on the a clock (clk) signal.

The MUX_BLOCK_RIGHT multiplexer 414 may comprise suitable logic, circuitry, and/or code that may be adapted to select between the FO_out signal from the FO function 412 and the FL_out signal from the FL function 408. The selection may be controlled by the stage_0 signal. The bitwise XOR operation 420 may comprise suitable logic, circuitry, and/or code that may be adapted to XOR the output of the MUX_BLOCK_RIGHT multiplexer 414 and the output of the pipe_right register 418. The bitwise XOR operation 420 may produce the block_right signal.

In operation, the start signal is an input to KASUMI algorithm system 400 and is held high for one clock cycle indicating the start of the KASUMI algorithm operation. The start signal may be used to control the MUX_L multiplexer 402 and the MUX_R multiplexer 416, and may also be used to clock input data IN_KASUMI[63:32], and IN_KASUMI[31:0] to the pipe_left register 404 and the pipe_right register 418 respectively. The FO_done is another control signal utilized to control the MUX_L multiplexer 402 and the MUX_R multiplexer 416, and may be used to clock the block_right signal and the block_left signal to the pipe_left register 404 and the pipe_right register 418 respectively.

The FO_done signal may be utilized to update a counter such as a 3-bit stage counter that keeps track of the number of rounds. The Least Significant Bit (LSB) of the stage counter may be the stage_0 signal, which may be used to keep track of when a round in the KASUMI algorithm is even or odd. For example, when the stage_0 signal is 0 it is an odd round and when it is 1 it is an even round. The stage_0 signal may be used to control the MUX_L multiplexer 402 and the MUX_R multiplexer 416, which selects the inputs to the FL function 408 and the FO function 412 respectively. In instances when the round is odd, that is, the stage_0 signal is 0, the inputs to the FL function 408 and the FO function 412 are the output of the pipe_left register 404 and the FL_out signal respectively. In instances when the round is even, the inputs to the FL function 408 and the FO function 412 are the output of the FO_out signal and the output of the pipe_left register 404 respectively.

The stage_0 signal may also be utilized to control the MUX_BLOCK_RIGHT multiplexer 414. For example, when the stage_0 signal is logic 0, the FO_out signal may be XORed with the output of the pipe_right register 418 to generate the block_right signal. When the stage_0 signal is logic 1, the FL_out signal may be XORed with the output of the pipe_right register 418 to generate the block_right signal. The block_left signal and the block_right signal may be fed back to the MUX_R multiplexer 416 and the MUX_L multiplexer 402 respectively. The output signal OUT_KASUMI [63:0] of the KASUMI algorithm system 400 may be a concatenation of the block_right signal and the block_left signal and may be registered when the stage counter indicates completion of eight rounds.

Figure 5:
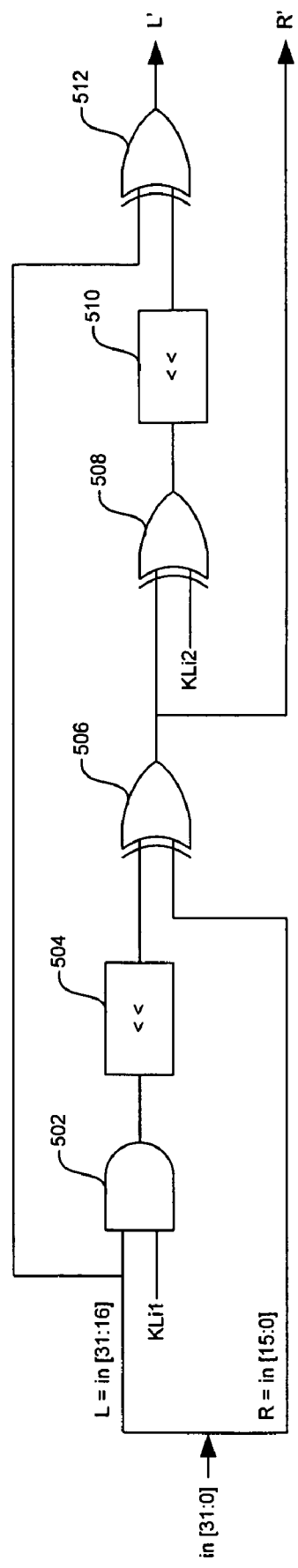
FIG. 5 is a circuit diagram of an exemplary implementation of an FL function, which may be utilized in connection with an embodiment of the invention.

FIG. 5 is a circuit diagram of an exemplary implementation of an FL function, which may be utilized in connection with an embodiment of the invention. According to FIG. 5, the FL function 408 in FIG. 4 may comprise an AND gate 502, a first circular 1-bit shifter 504, a first XOR gate 506, a second XOR gate 508, a second circular 1-bit shifter 510, and a third XOR gate 512.

In operation, the FL function 408 may take 32-bits of input data and a 32-bit subkey $KL_i$ and return 32-bits of output data. The subkey may be split into two 16-bit subkeys, $KL_{i,1}$ and $KL_{i,2}$ where $KL_i=KL_{i,1}\|KL_{i,2}$, where $\|$ represents concatenation operation. The 32-bit wide input to the FL function 408, in[31:0], may be divided into a 16 MSB signal L, where L=in[31:16], and a 16 LSB signal R, where R=in[15:0], where I=L$\|$R. The outputs of the FL function 408 may be defined as R'=R$\oplus$ROL(L$\cap KL_{i,1}$) and L'=L$\oplus$ROL(R'$\cup KL_{i,2}$), where ROL is a left circular rotation of the operand by one bit; $\cap$ is a bitwise AND operation; $\cup$ is a bitwise OR operation; and $\oplus$ is bitwise XOR operation.

The signal L and the subkey $KL_{i,1}$ may be utilized as inputs to the AND gate 502. The signal L may also be utilized as input to the third XOR gate 512. The output of the AND gate 502 may be bit shifted by the first circular 1-bit shifter 504. The output of the first circular 1-bit shifter 504 and the signal R may be utilized as input to the first XOR gate 506. The output of the first XOR gate 506 and the subkey $KL_{i,2}$ may be used as inputs to the second XOR gate 508. The output of the first XOR gate 506, R', may correspond to the 16 LSB of the output of the FL function 408, FL_out. The output of the second XOR gate 508 may be utilized as an input to the second circular 1-bit shifter 510. The output of the second circular 1-bit shifter 510 and the signal L may be used as inputs to third XOR gate 512. The output of the third XOR 512, L', may correspond to the 16 MSB of the output of the FL function 408, FL_out.

Figure 6:
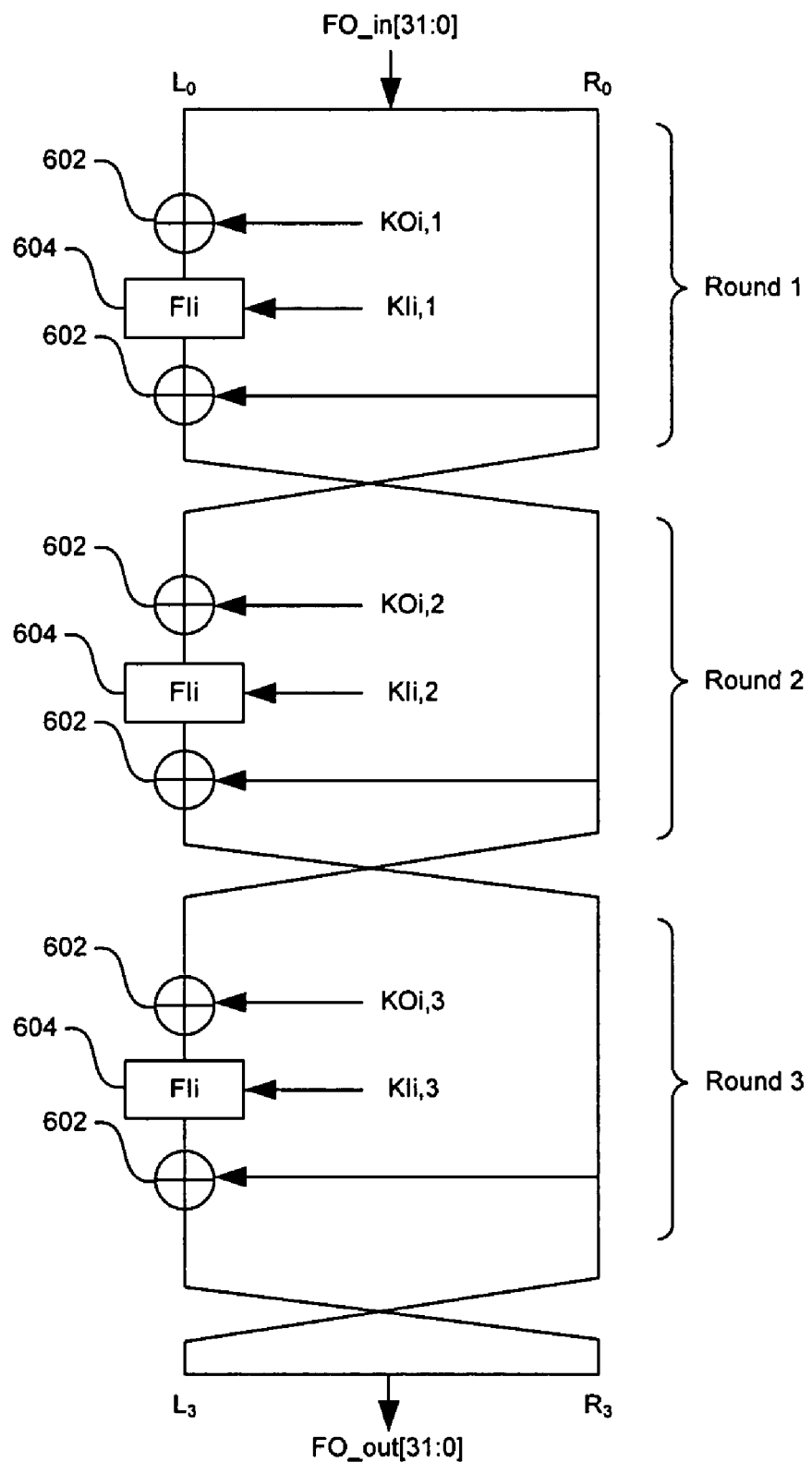
FIG. 6 is a flow diagram that illustrates a three-round FO function, which may be utilized in connection with an embodiment of the invention.

FIG. 6 is a flow diagram that illustrates a three-round FO function, which may be utilized in connection with an embodiment of the invention. Referring to FIG. 6, the FO function 412 in FIG. 4 may utilize a 32-bit data input, FO_in [31:0] and two sets of subkeys, namely a 48-bit subkey $KO_i$ and 48-bit subkey $KI_i$. Each round of the three-round FO function 412 may comprise a bitwise XOR operation 602 and an FIi function 604, where the $i^{th}$ index indicates the corresponding round in the eight-round KASUMI algorithm in FIG. 3. The bitwise XOR operation 602 may comprise suitable logic, circuitry, and/or code that may be adapted to perform a 16-bit XOR operation. The FIi function 604 may comprise suitable logic, circuitry, and/or code that may be adapted to perform the FI function in the KASUMI algorithm as specified by the 3GPP technical specification. The FIi function 604 may comprise four rounds of operations.

In operation, the 32-bit data input to the three-round FO function 412 may be split into two halves, $L_0$ and $R_0$, where $L_0$=FO_in[31:16] and $R_0$=FO_in[15:0]. The 48-bit subkeys are subdivided into three 16-bit subkeys where $KO_i=KO_{i,1}\|KO_{i,2}\|KO_{i,3}$ and $KI_i=KI_{i,1}\|KI_{i,2}\|KI_{i,3}$. For each $j^{th}$ round of the three-round FO function, where $1\leq j\leq 3$, the right and left inputs may be defined as $R_j=FI(L_{j-1}\oplus KO_{i,j},KI_{i,j})\oplus R_{j-1}, L_j=R_{j-1}$, where FI( ) is the four-round FI function of the KASUMI algorithm. The FO function 412 produces a 32-bit output, FO_out[31:0], where FO_out[31:0]=$L_3\|R_3$.

Figure 7:
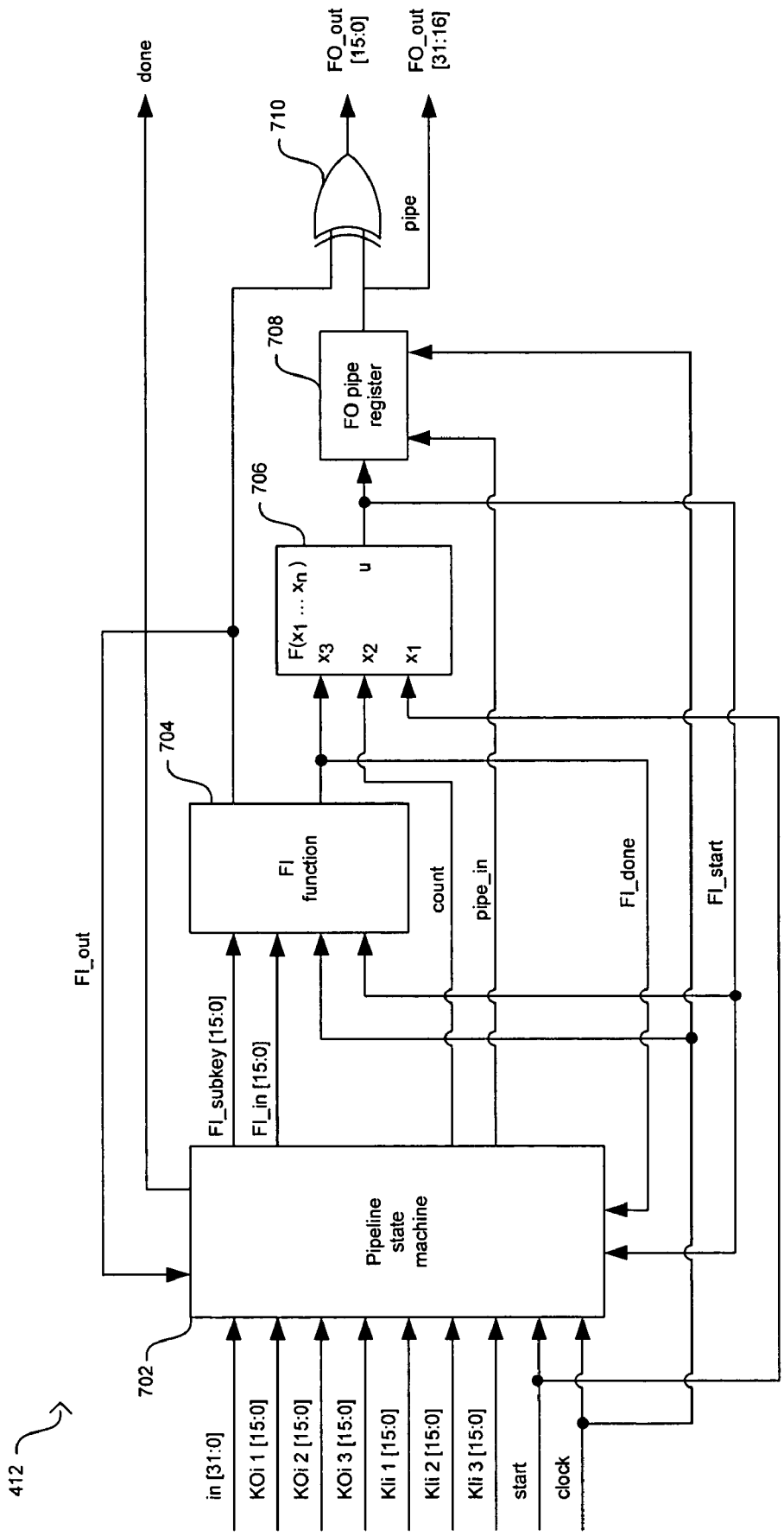
FIG. 7 is a block diagram of an exemplary implementation of the FO function, in accordance with an embodiment of the invention.

FIG. 7 is a block diagram of an exemplary implementation of the FO function, in accordance with an embodiment of the invention. Referring to FIG. 7, an implementation of the FO function 412 in FIG. 4 may comprise a pipeline state machine 702, an FI function 704, a combiner 706, an FO pipe register 708, and an FO XOR operation 710. The pipeline state machine 702 may comprise suitable logic, circuitry, and/or code that may be adapted to control the flow of data and pipelining stages in each of the FO function rounds in the FO function 412. The FI function 704 may comprise suitable logic, circuitry, and/or code that may be adapted to perform the FI function of the KASUMI algorithm as specified by the 3GPP technical specifications. The combiner 706 may comprise suitable logic, circuitry, and/or code that may be adapted to control the start of the FI function 704. The FO pipe register 708 may comprise suitable logic, circuitry, and/or code that may be adapted to store the 16 MSB of the output of the FO function 412, FO_out[31:16]. The FO XOR operation 710 may comprise suitable logic, circuitry, and/or code that may be adapted to produce the 16 LSB of the output of the FO function 412, FO_out[15:0].

The pipelined architecture of the FO function 412 illustrated in FIG. 7, may be utilized to minimize the number of logic cells needed to implement the FO function. The 16-bit subkeys $KO_{i,1}$, $KO_{i,2}$, $KO_{i,3}$, $KI_{i,1}$, $KI_{i,2}$, and $KI_{i,3}$ that may be utilized as inputs to the pipelined state machine 702 may be generated by, for example, a key scheduler. A start signal may be provided by a top-level module or by an external source. The pipeline state machine 702 may be configured to generate the appropriate inputs to the FI function 704 depending on the pipelining stage. For example, the pipeline state machine 702 may generate the signal FI_in[15:0]=$L_{j-1}\oplus KO_{i,j}$ for $1<=j<=3$ and the corresponding 16-bit subkeys $KI_{i,j}$ for $1<=j<=3$.

The FI function 704 may generate a data output signal FI_out and an FI_done to indicate completion of its task. The FI_start signal may be generated by the combiner 706 based on the count, start, and FI_done signals. The FI_start signal may be used to initiate the FI function 704. The start signal is input to FO function 412 to indicate the start of the FO function processing in the KASUMI algorithm. The count signal may be used to control the pipelined state machine 702 which controls the pipeline operation. The FI_done signal generated by FI function 704 may be used to indicate completion of its task. The FI_start signal may be represented in pseudo-code as FI_start=start OR ((count !=3) AND FI_done)).

When the FO function 412 processing is initiated by the start signal, the FI_start signal is high thus initiating the processing by the FI function 704 for the first time. Once FI function 704 completes its task, it may generate the FI_done signal. The FI_done signal may be utilized to generate the FI_start signal for next iteration. The count signal may be monitored so that three applications or rounds of processing in the FI function 704 are achieved. The FI_out, FI_done and FI_start signals may be fed back to the pipelined state machine 702 to update the pipeline stages.

The outputs of the various pipeline stages may be stored in FO pipe register 708, and the pipelining process may be terminated at the end of the pipeline operation as indicated by the done signal generated by the pipeline state machine 702. At this time, the output of the FI function 704 may be given by FO_out[31:0].

Figure 8:
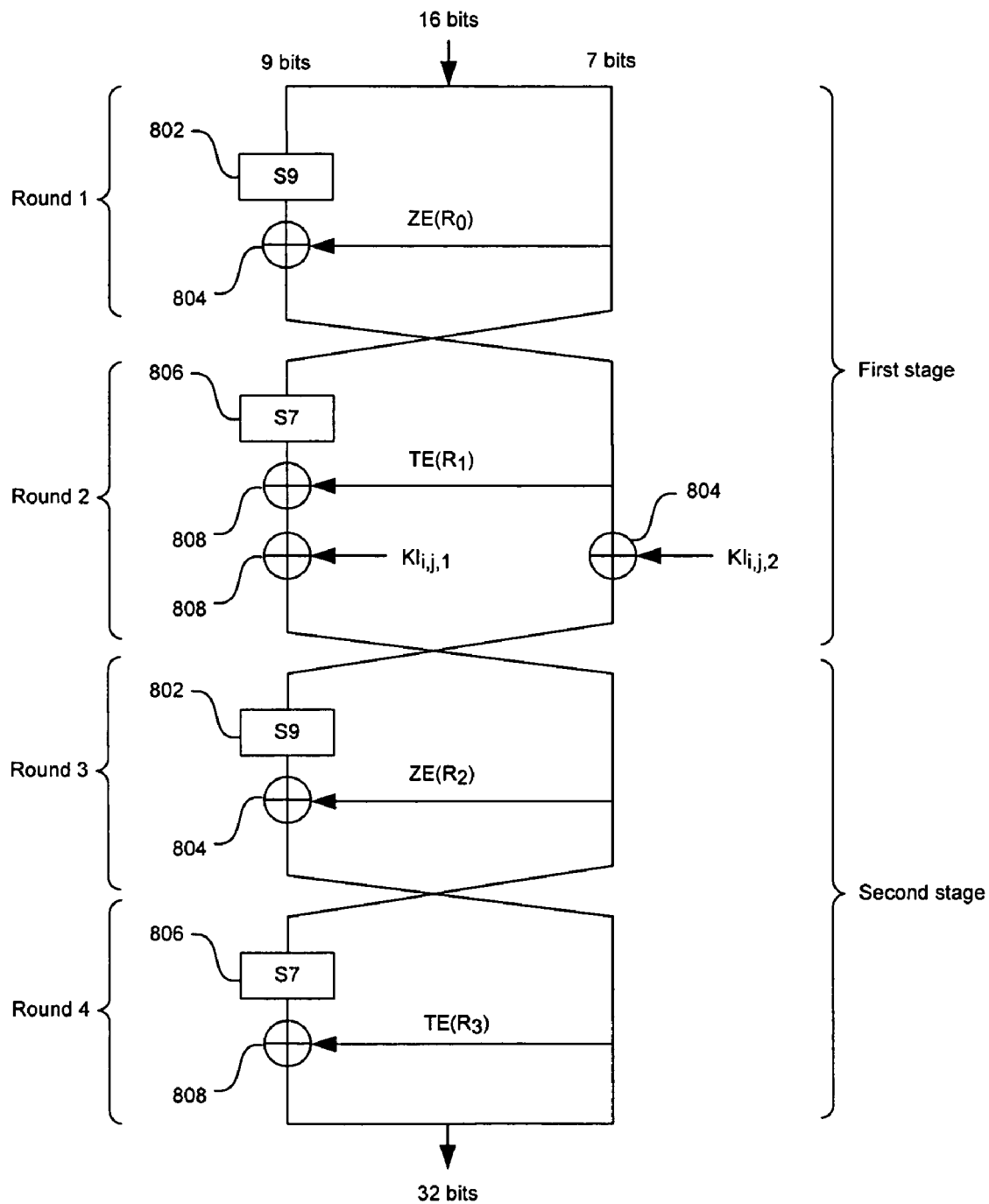
FIG. 8 is a flow diagram that illustrates a four-round FI function, which may be utilized in connection with an embodiment of the invention.

FIG. 8 is a flow diagram that illustrates a four-round FI function, which may be utilized in connection with an embodiment of the invention. Referring to FIG. 8, the FI function 704 in FIG. 7 may operate on a 16-bit input FI_in [15:0] with a 16-bit subkey $KI_{i,j}$, where the $i^{th}$ and $j^{th}$ indices correspond to the current KASUMI and FO function rounds respectively. The input FI_in[15:0] may be split into two unequal components, a 9-bit left half $L_0$=FI_in[15:7] and a 7-bit right half $R_0$=FI_in[6:0] where FI_in[15:0]=$L_0$||$R_0$. Similarly the subkey $KI_{i,j}$ may be split into a 7-bit component $KI_{i,j,1}$ and a 9-bit component $KI_{i,j,2}$, where $KI_{i,j}$=$KI_{i,j,1}$||$KI_{i,j,2}$.

The FI function 704 may comprise four rounds of operations, where the first two rounds may correspond to a first stage of the FI function and the last two rounds may correspond to a second stage of the FI function. The FI function 704 may comprise a 9-bit substitution box (S9) 802, a 7-bit substitution box (S7) 806, a plurality of 9-bit XOR operations 804, and a plurality of 7-bit XOR operations 808. The S9 802 may comprise suitable logic, circuitry, and/or code that may be adapted to map a 9-bit input signal to a 9-bit output signal. The S7 806 may comprise suitable logic, circuitry, and/or code that may be adapted to map a 7-bit input signal to a 7-bit output signal. The 9-bit XOR operation 804 may comprise suitable logic, circuitry, and/or code that may be adapted to provide a 9-bit output for an XOR operation between two 9-bit inputs. The 7-bit XOR operation 808 may comprise suitable logic, circuitry, and/or code that may be adapted to provide a 7-bit output for an XOR operation between two 7-bit inputs.

In operation, the first round of the FI function 704 may generate the outputs $L_1$=$R_0$ and $R_1$=S9[$L_0$]⊕ZE($R_0$), where ⊕ represents the 9-bit XOR operation 804, S9[$L_0$] represents the operation on $L_0$ by the S9 802, and ZE($R_0$) represents a zero-extend operation that takes the 7-bit value $R_0$ and converts it to a 9-bit value by adding two zero (0) bits to the most significant end or leading end. The second round of the FI function 704 may generate the output $R_2$=S7[$L_1$]⊕TR($R_1$)⊕$KI_{i,j,1}$, where ⊕ represents the 7-bit XOR operation 808, S7[$L_1$] represents the operation on $L_1$ by the S7 806, and TE($R_1$) represents a truncation operation that takes the 9-bit value $R_1$ and converts it to a 7-bit value by discarding the two most significant bits. The second round of the FI function 704 may also generate the output $L_2$=$R_1$⊕$KI_{i,j,2}$, where ⊕ represents the 9-bit XOR operation 804. The first pipelined stage of operation of the FI function 704 comprises the operations in the first and second rounds of the FI function 704.

The third round of the FI function 704 may generate the outputs $L_3$=$R_2$ and $R_3$=S9[$L_2$]⊕ZE($R_2$), where ⊕ represents the 9-bit XOR operation 804, S9[$L_2$] represents the operation on $L_2$ by the S9 802 and ZE($R_2$) represents a zero-extend operation that takes the 7-bit value $R_2$ and converts it to a 9-bit value by adding two zero bits to the most significant end or leading end. The fourth round of the FI function 704 may generate the outputs $L_4$=S7[$L_3$]⊕TE($R_3$) and $R_4$=$R_3$, where ⊕ represents the 7-bit XOR operation 808, S7[$L_3$] represents the operation on $L_3$ by the S7 806 and TE($R_3$) represents a truncation operation that takes the 9-bit value $R_3$ and converts it to a 7-bit value by discarding the two most significant bits. The second pipelined stage of operation of the FI function 704 comprises the operations in the third and fourth rounds of the FI function 704. The output of the FI function 704, FI_out [15:0], is a 16-bit value that corresponds to $L_4$||$R_4$, where $L_4$=FI_out[15:7] and $R_4$=FI_out[6:0].

Figure 9:
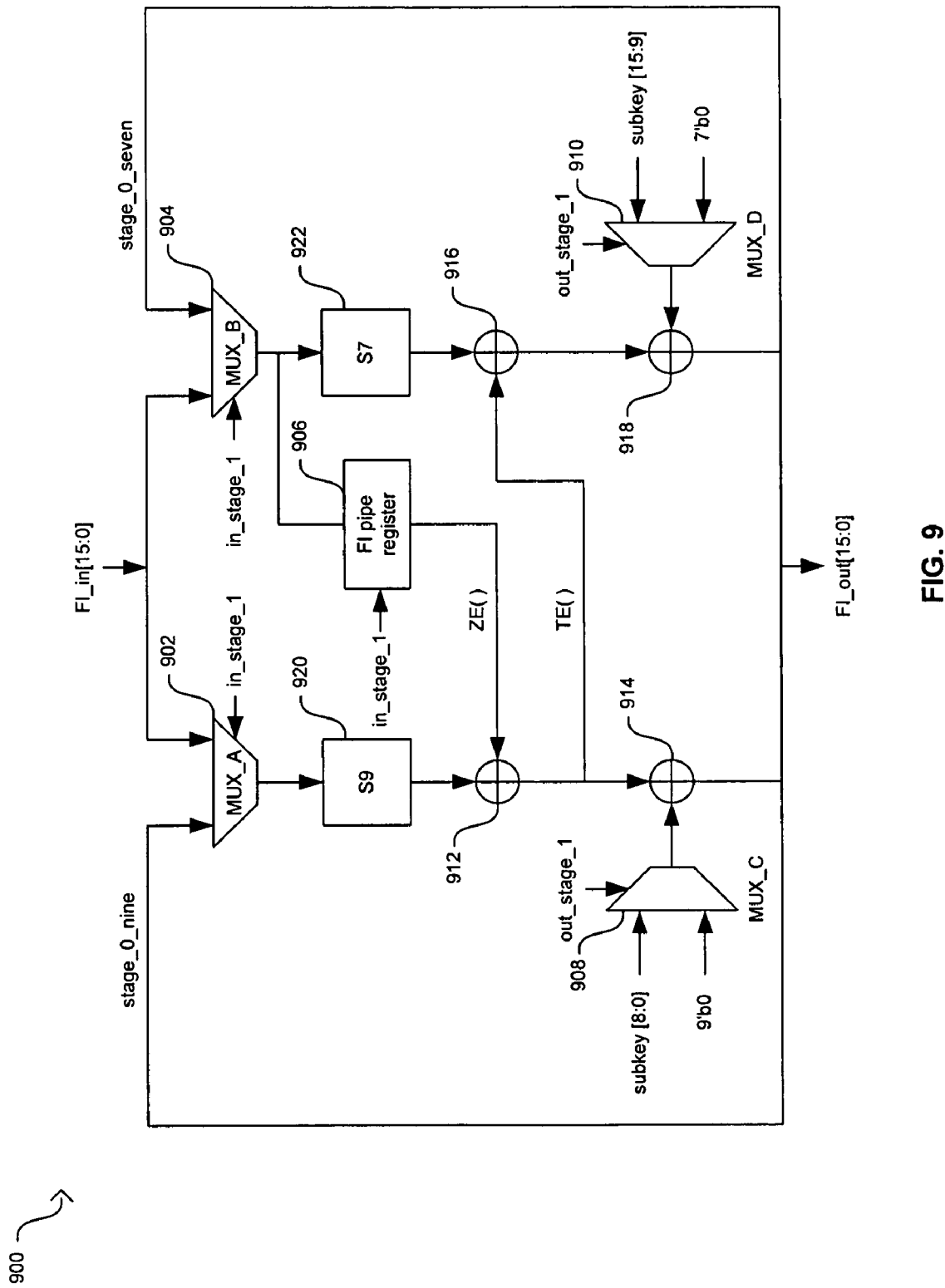
FIG. 9 is a circuit diagram of an exemplary implementation of the FI function, in accordance with an embodiment of the invention.

FIG. 9 is a circuit diagram of an exemplary implementation of the FI function, in accordance with an embodiment of the invention. Referring to FIG. 9, a pipelined implementation 900 of the FI function 704 in FIG. 7 may comprise a MUX_A multiplexer 902, a MUX_B multiplexer 904, a MUX_C multiplexer 908, a MUX_D multiplexer 910, an S9 920, an S7 922, a first 9-bit XOR gate 912, a second 9-bit XOR gate 914, a first 7-bit XOR gate 916, a second 7-bit XOR gate 918, and an FI pipe register 906. The S9 920 may correspond to the S9 802 in FIG. 8 and may comprise suitable logic, circuitry, and/or code that may be adapted to map a 9-bit input signal to a 9-bit output signal. The S7 922 may correspond to the S7 806 in FIG. 8 and may comprise suitable logic, circuitry, and/or code that may be adapted to map a 7-bit input signal to a 7-bit output signal. The first 9-bit XOR gate 912 and the second 9-bit XOR gate 914 may correspond to the 9-bit XOR operation 804 in FIG. 8 and may comprise suitable logic, circuitry, and/or code that may be adapted to provide a 9-bit output for an XOR operation between two 9-bit inputs. The first 7-bit XOR gate 916 and the second 7-bit XOR gate 918 may correspond to the 7-bit XOR operation 808 in FIG. 8 and may comprise suitable logic, circuitry, and/or code that may be adapted to provide a 9-bit output for an XOR operation between two 9-bit inputs.

The MUX_A multiplexer 902 may comprise suitable logic, circuitry, and/or code that may be adapted to select the input to the S9 920 according to whether it is the first pipelined stage or second pipelined stage of operation of the FI function 704. The selection may be controlled by a pipeline signal in_stage_1 signal. The MUX_B multiplexer 904 may comprise suitable logic, circuitry, and/or code that may be adapted to select the input to the S7 922 according to whether it is the first pipelined stage or second pipelined stage of operation of the FI function 704. The selection may be controlled by the pipeline signal in_stage_1 signal. The MUX_C multiplexer 908 may comprise suitable logic, circuitry, and/or code that may be adapted to select the input to the second 9-bit XOR gate 914 according to whether it is the first stage or second stage of the FI function 704. The selection may be controlled by a pipeline signal out_stage_1 signal. The MUX_D multiplexer 910 may comprise suitable logic, circuitry, and/or code that may be adapted to select the input to the second 7-bit XOR gate 918 according to whether it is the first stage or second stage of the FI function 704. The selection may be controlled by the pipeline signal out_stage_1 signal.

The S9 920 and the S7 922 may be implemented, for example, as combinational logic or as at least one look-up table. For example, the S7 922 may be implemented as a look-up table using a synchronous 128×7 Read Only Memory (ROM), in which 7-bits may be utilized for addressing 128 locations, while the S9 920 may be implemented using a synchronous 512×9 ROM, in which 9-bits may be utilized for addressing 512 locations. The FI pipe register 906 may comprise suitable logic, circuitry, and/or code that may be adapted to store the input to the 7-bit substitution box 922, zero extend the stored input, and transfer the zero-extended stored input to the first 9-bit XOR gate 912. The storage and transfer may be based on the pipeline signal in_stage_1.

In operation, the inputs to the FI function 704 are the 16-bit data input FI_in[15:0], a 16-bit subkey FI_subkey[15:0], and the FI_start signal from the controller 706 in FIG. 7. The pipelined implementation 900 is synchronous and clocking may be provided by the clock signal shown in FIG. 7. In the first pipelined stage of operation, the FI_start signal may be held high for one clock cycle. The pipeline signal in_stage_1, which may be a single clock cycle delayed version of the FI_start signal, may be adapted so that it lags the FI_start signal. The inputs to S9 920 and S7 922 are FI_in[15:7] and FI_in[6:0] respectively. On the next clock cycle, which corresponds to the second pipelined stage of operation, the pipeline signal in_stage_1 is high and the inputs to S9 920 and S7 922 are the stage_0_nine signal and stage_0_seven signal respectively.

The pipeline signal out_stage_1 may be a single clock cycle delayed version of the pipeline signal in_stage_1 signal, and may be utilized to select the subkeys subkey[8:0] and subkey[15:9]. When the pipeline signal out_stage_1 is low, the subkeys subkey[8:0] and subkey[15:9] may be selected in MUX_C multiplexer 908 and MUX_D multiplexer 910 respectively for the first pipelined stage of the pipeline process. On the second and final pipelined stage of the pipeline process, the subkeys are not utilized, and zeros values of appropriate bit lengths, namely 9-bit for XORing with the second 9-bit XOR gate 914 and 7-bit for XORing with the second 7-bit XOR gate 918 may be selected. An FI_done signal may be generated by the FI function 704 to indicate completion of the pipelined process. This FI_done signal may be generated using pipeline signal out_stage_1.

The KASUMI algorithm has a 128-bit key K and each of the eight rounds of the KASUMI algorithm, and the corresponding FO, FI, and FL functions, may utilize 128 bits of key derived from K. To determine the round subkeys, two arrays of eight 16-bit subkeys, $K_j$ and $K_j'$, where j=1 to 8, may be derived. The first array of 16-bit subkeys $K_1$ through $K_8$ is such that $K=K_1\|K_2\|K_3\|\ldots\|K_8$. The second array of subkeys may be derived from the first set of subkeys by the expression $K_j'=K_j \oplus C_j$, where $C_j$ is a constant 16-bit value that may be defined in hexadecimal as: $C_1$=0x0123, $C_2$=0x4567, $C_3$=0x89AB, $C_4$=0xCDEF, $C_5$=0xFEDC, $C_6$=0xBA98, $C_7$=0x7654, and $C_8$=0x3210.

FIG. 10 illustrates the round subkeys generated by a key scheduler from the arrays of subkeys $K_j$ and $K_j'$ for the eight-round KASUMI algorithm, in accordance with an embodiment of the invention. Referring to FIG. 10, a key scheduler may comprise suitable logic, circuitry, and/or code that may be adapted to generate the subkey triplet $KL_i$, $KO_i$, and $KI_i$ required for the KASUMI algorithm from the two arrays of subkeys $K_j$ and $K_j'$. Because the KASUMI algorithm, the FO function, and the FI function are pipelined, one round of the KASUMI algorithm may be repeated eight times to achieve reduction in power and IC area. The subkey triplet $KL_i$, $KO_i$, and $KI_i$ may be further divided into $KL_i=KL_{i,1}\|KL_{i,2}$, $KO_i=KO_{i,1}\|KO_{i,2}\|KO_{i,3}$, and $KI_i=KI_{i,1}\|KI_{i,2}\|KI_{i,3}$. The 16-bit rotations shown in FIG. 10 that may be utilized to obtain the subkeys, may be implemented with, for example, shift registers and/or combinational logic.

In accordance with an embodiment of the invention, the pipeline process of the FI function in the KASUMI algorithm may take two clock cycles to complete in the pipelined implementation 900. Accordingly, the pipelined implementation 900 provides a cost effective and efficient implementation that accelerates cryptographic operations in GSM/GPRS/EDGE compliant handsets.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for accelerating cryptography operations, the method comprising:
   generating a first signal that controls:
      a first stage of substitution in a first substitution circuit and a second substitution circuit; and
      a second stage of substitution in a first substitution circuit and a second substitution circuit;
   generating a first substituted output from a first portion of an input data by using said first substitution circuit during a first round of said first stage of substitution;
   generating a second substituted output from a second portion of said input data by using said second substitution circuit during a second round of said first stage of substitution; and
   pipelining transfer of said second portion of said input data for processing with said generated first substituted output from said first substitution circuit during said first round of said first stage of substitution and a third round of said second stage of substitution.

2. The method according to claim 1, wherein said first signal is a delayed version of a start signal.

3. The method according to claim 1, wherein said first signal is delayed by one clock cycle from a start signal.

4. The method according to claim 1, comprising zero-extending said second portion of said input data to said second substitution circuit for said pipelining transfer.

5. The method according to claim 4, comprising generating a first XORed output by XORing said zero-extended second portion of said input data to said second substitution circuit with said generated first substituted output from said first substitution circuit during said first round of said first stage of substitution.

6. The method according to claim 5, comprising truncating said first XORed output to generate a first truncated output during a second round of said first stage of substitution.

7. The method according to claim 6, comprising generating a second XORed output by XORing said first truncated output with said generated second substituted output from said second substitution circuit during said second round of said first stage of substitution.

8. The method according to claim 7, comprising:
selecting a second subkey; and
XORing said selected second subkey with said second XORed output to generate a third XORed output during said second round of said first stage of substitution.

9. The method according to claim 8, comprising:
selecting a first subkey; and
XORing said selected first subkey with said first XORed output to generate a fourth XORed output during said second round of said first stage of substitution.

10. The method according to claim 9, comprising generating a third substituted output from said fourth XORed output by using said first substitution circuit during said third round in said second stage of substitution.

11. The method according to claim 10, comprising zero-extending said third XORed output for said pipelining transfer during said third round of said second stage of substitution.

12. The method according to claim 11, comprising generating a fifth XORed output by XORing said zero-extended third XORed output with said generated third substituted output from said first substitution circuit during said third round of said second stage of substitution.

13. The method according to claim 12, comprising truncating said fifth XORed output to generate a second truncated output during a fourth round of said second stage of substitution.

14. The method according to claim 13, comprising generating a fourth substituted output from said third XORed output by using said second substitution circuit during said fourth round of said second stage of substitution.

15. The method according to claim 14, comprising generating a sixth XORed output by XORing said second truncated output with said generated fourth substituted output from said second substitution circuit during said fourth round of said second stage of substitution.

16. The method according to claim 15, comprising:
selecting a second zero value; and
XORing said selected second zero value with said sixth XORed output to generate a seventh XORed output during said fourth round of said second stage of substitution.

17. The method according to claim 16, comprising:
selecting a first zero value; and
XORing said selected first zero value with said fifth XORed output to generate an eighth XORed output during said fourth round of said second stage of substitution.

18. The method according to claim 17, comprising generating an output data by concatenating said seventh XORed output and said eighth XORed output.

19. A system for accelerating cryptography operations, the system comprising:
a first substitution circuit that generates a first substituted output from a first portion of an input data during a first round of a first stage of substitution;
a second substitution circuit that generates a second substituted output from a second portion of said input data during a second round of said first stage of substitution; and
a pipe register that pipeline transfers said second portion of said input data for processing with said generated first substituted output from said first substitution circuit during said first round of said first stage of substitution.

20. The system according to claim 19, wherein said first substitution circuit generates a third substituted output during a third round of a second stage of substitution.

21. The system according to claim 19, wherein said second substitution circuit generates a fourth substituted output during a fourth round of a second stage of substitution.

22. The system according to claim 19, wherein a first multiplexer selects an input to said first substitution circuit for said first stage of substitution and for a second stage of substitution.

23. The system according to claim 19, wherein a second multiplexer selects an input to said second substitution circuit for said first stage of substitution and a for a second stage of substitution.

24. The system according to claim 19, wherein a first XOR gate XORs an output of said first substitution circuit with an output of said pipe register.

25. The system according to claim 19, wherein a second XOR gate XORs an output of a first XOR gate with an output of a third multiplexer.

26. The system according to claim 19, wherein a third XOR gate XORs an output of said second substitution circuit with an output of a first XOR gate.

27. The system according to claim 19, wherein a fourth XOR gate XORs an output of a second XOR gate with an output of a fourth multiplexer.

28. The system according to claim 19, wherein a third multiplexer selects between a first subkey during said first stage of substitution and a first zero value during a second stage of substitution.

29. The system according to claim 19, wherein a fourth multiplexer selects between a second subkey during said first stage of substitution and a second zero value during a second stage of substitution.

30. A system for accelerating cryptography operations, the system comprising:
one or more circuits comprising a first substitution circuit and a second substitution circuit, said one or more circuits enable generation of a first signal that controls:
a first stage of substitution in said first substitution circuit and said second substitution circuit; and
a second stage of substitution in said first substitution circuit and said second substitution circuit;
said one or more circuits enable generation of a first substituted output from a first portion of an input data by using said first substitution circuit during a first round of said first stage of substitution;

said one or more circuits enable generation of a second substituted output from a second portion of said input data by using said second substitution circuit during a second round of said first stage of substitution; and said one or more circuits enable pipelining transfer of said second portion of said input data for processing with said generated first substituted output from said first substitution circuit during said first round of said first stage of substitution and a third round of said second stage of substitution.

31. The system according to claim 30, wherein said one or more circuits enable delaying a start signal to generate said first signal.

32. The system according to claim 30, wherein said one or more circuits enable delaying a start signal by one clock cycle to generate said first signal.

33. The system according to claim 30, wherein said one or more circuits enable zero-extending said second portion of said input data to said second substitution circuit for said pipelining transfer.

34. The system according to claim 33, wherein said one or more circuits enable generation of a first XORed output by XORing said zero-extended second portion of said input data to said second substitution circuit with said generated first substituted output from said first substitution circuit during said first round of said first stage of substitution.

35. The system according to claim 34, wherein said one or more circuits enable truncation of said first XORed output to generate a first truncated output during a second round of said first stage of substitution.

36. The system according to claim 35, wherein said one or more circuits enable generation of a second XORed output by XORing said first truncated output with said generated second substituted output from said second substitution circuit during said second round of said first stage of substitution.

37. The system according to claim 36, wherein said one or more circuits enable selection of a second subkey; and said one or more circuits enable XORing of said selected second subkey with said second XORed output to generate a third XORed output during said second round of said first stage of substitution.

38. The system according to claim 37, wherein said one or more circuits enable selection of a first subkey; and said one or more circuits enable XORing of said selected first subkey with said first XORed output to generate a fourth XORed output during said second round of said first stage of substitution.

39. The system according to claim 38, wherein said one or more circuits enable generation of a third substituted output from said fourth XORed output by using said first substitution circuit during said third round in said second stage of substitution.

40. The system according to claim 39, wherein said one or more circuits enable zero-extending of said third XORed output for said pipelining transfer during said third round of said second stage of substitution.

41. The system according to claim 40, wherein said one or more circuits enable generation of a fifth XORed output by XORing said zero-extended third XORed output with said generated third substituted output from said first substitution circuit during said third round of said second stage of substitution.

42. The system according to claim 41, wherein said one or more circuits enable truncation of said fifth XORed output to generate a second truncated output during a fourth round of said second stage of substitution.

43. The system according to claim 42, wherein said one or more circuits enable generation of a fourth substituted output from said third XORed output by using said second substitution circuit during said fourth round of said second stage of substitution.

44. The system according to claim 43, wherein said one or more circuits enable generation of a sixth XORed output by XORing said second truncated output with said generated fourth substituted output from said second substitution circuit during said fourth round of said second stage of substitution.

45. The system according to claim 44, wherein said one or more circuits enable selection of a second zero value; and said one or more circuits enable XORing of said selected second zero value with said sixth XORed output to generate a seventh XORed output during said fourth round of said second stage of substitution.

46. The system according to claim 45, wherein said one or more circuits enable selection of a first zero value; and said one or more circuits enable XORing of said selected first zero value with said fifth XORed output to generate an eighth XORed output during said fourth round of said second stage of substitution.

47. The system according to claim 46, wherein said one or more circuits enable generation of an output data by concatenating said seventh XORed output and said eighth XORed output.

* * * * *